United States Patent [19]

Ortiz

[11] Patent Number: 4,856,020
[45] Date of Patent: Aug. 8, 1989

[54] LASER MIRROR ALIGNMENT MECHANISM

[75] Inventor: Mark V. Ortiz, Mountain View, Calif.

[73] Assignee: Spectra-Physics, Inc., San Jose, Calif.

[21] Appl. No.: 206,845

[22] Filed: Jun. 15, 1988

[51] Int. Cl.[4] ............................................. H01S 3/086
[52] U.S. Cl. ...................................... 372/107; 372/65; 372/88
[58] Field of Search ...................... 372/107, 61, 65, 87, 372/88

[56] References Cited

U.S. PATENT DOCUMENTS

| | | | |
|---|---|---|---|
| 3,826,998 | 7/1974 | Kindle et al. | 372/107 |
| 3,839,684 | 10/1974 | Matsuoka et al. | 372/107 |
| 4,030,047 | 6/1977 | Fletcher et al. | 372/107 |
| 4,203,080 | 5/1980 | Wright et al. | 331/94.5 D |
| 4,232,275 | 11/1980 | Kolb, Jr. | 372/107 |
| 4,644,554 | 2/1987 | Sheng | 372/107 |
| 4,665,529 | 5/1987 | Baer et al. | 372/107 |

FOREIGN PATENT DOCUMENTS 0204290 11/1984 Japan .................................. 372/107

Primary Examiner—William L. Sikes
Assistant Examiner—Xuân Thi Vo
Attorney, Agent, or Firm—Killworth, Gottman, Hagan & Schaeff

[57] ABSTRACT

A laser has a central axis, an outer envelope, a cathode end cap attached to the cathode end of the envelope, a cathode post attached at an inner end to the cathode end cap and extending axially therefrom generally coaxially along the central axis, and a laser mirror mounted to an outer end of the cathode post. An alignment mechanism is provided at the cathode end of the laser for aligning the mirror in a desired predetermined relation to the central axis. The alignment mechanism inlcudes a cylindrical collar mounted to the cathode end cap in surrounding and outward radially spaced relation to the mirror-supporting cathode post, and a plurality of adjustment screws mounted to the collar at circumferentially spaced locations about the cathode post. The screws are independently movably adjustable in a radial direction relative to the laser axis toward and away from the cathode post for selectively applying deformation-inducing contact forces to the post directed transversely to the laser axis for causing angular deformation of the post relative to the laser axis to align the mirror mounted thereon in the desired predetermined relation to the axis.

10 Claims, 1 Drawing Sheet

LASER MIRROR ALIGNMENT MECHANISM

BACKGROUND OF THE INVENTION

The present invention generally relates to lasers and, more particularly, to a mechanism for adjustably aligning a laser mirror to its proper precise position for producing optimum lasing action.

A conventional gas discharge laser, such as a helium-neon gas laser, typically includes an outer envelope which mounts components at its opposite ends defining an anode and a cathode. End mirrors are mounted adjacent opposite ends of the envelope by the anode and cathode components, and a bore tube is mounted within the envelope and in alignment with the end mirrors. To form an optical resonant cavity and produce optimum lasing action, the bore tube and end mirrors must be precisely aligned along a common, central axis.

Adjustment of mirror alignment is made possible by the arrangement in which the mirrors are mounted at the ends of the laser envelope. For instance, with regard to the mounting arrangement of the cathode mirror in a typical laser construction, the cathode components include a cathode end cap attached to one end of the outer envelope of the laser and a cathode post electrically and mechanically connected thereto. The cathode end cap has a central opening and the cathode post is fixed at its inner end to the cathode end cap such that its central passage is coaxially aligned through the end cap opening with the central axis of the laser. The cathode mirror is mounted to the outer end of the cathode post, such as being adhesively bonded thereto, so as to extend generally perpendicular to the central axis of the laser.

Generally speaking, alignment of the cathode mirror is typically carried out empirically by a technician during production of the laser. The laser is placed in a test fixture and activated to an operating state. The technician then manually adjusts the angular position of the mirror by bending the cathode post until the laser is operating in an acceptable fashion.

Ordinarily, the technician bends the cathode post in one of two ways. The first way is a rather crude technique in which the cathode post is angularly deformed using a screwdriver. The second way is somewhat more refined. It uses a series of screws threaded into a plate attached to the inner end of the cathode post. The screws are threaded through holes in the plate so as to extend in generally parallel relation to the central axis and are pressed in contact against the cathode end cap. The technician threads selected ones of the screws toward the cathode end cap to cause the desired degree of tilting of the plate and cathode post and thereby the desired amount of angular adjustment of the cathode mirror with respect to the central axis.

The above-described techniques are simply too crude and unrefined to provide the degree of control over the adjustment process necessary to achieve the level of precision in mirror alignment desired for optimum laser performance. Consequently, a need still remains for an improved approach to precise alignment of the laser mirrors.

SUMMARY OF THE INVENTION

The present invention provides a laser mirror alignment mechanism designed to satisfy the aforementioned needs. The mirror alignment mechanism of the present invention is useful in a laser having a central axis and a deformable mirror-supporting member mounted at an end of the laser and generally coaxially along the axis thereof. The alignment mechanism comprises: an annular member adapted to be mounted at the laser end in surrounding and outward radially spaced relation to the mirror-supporting member; and a plurality of adjustment elements mounted to the annular member at circumferentially spaced locations about the mirror-supporting member. The adjustment elements are independently movably adjustable in a radial direction relative to the laser axis toward and away from the mirror-supporting member for selectively applying deformation-inducing contact forces on the mirror-supporting member directed transversely to the laser axis for causing angular deformation of the mirror-supporting member relative to the laser axis to align the mirror mounted on the mirror-supporting member in a desired predetermined relation to the axis.

More particularly, the annular member is in the form of a cylindrical collar which includes a base portion adapted to be attached to the laser end and having a central aperture adapted to receive the mirror-supporting member therethrough, and a cylindrical sidewall portion connected to the periphery of the base portion and extending therefrom. The sidewall portion of the collar has a plurality of circumferentially-spaced holes therethrough adapted to receive and mount the plurality of adjustment elements.

Still further, the plurality of adjustment elements are in the form of a plurality of threaded screws mounted through the sidewall portion of the collar. The holes in the sidewall portion are threaded to receive and mount the threaded screws.

Also, the mirror-supporting member of the alignment mechanism includes means defining a first weakened region in the form of a continuous groove in the member for permitting deformation thereof upon application of the deformation-inducing contact forces thereto by the selected ones of the adjustment elements. Further, another means defines a second weakened region in the form of another continuous groove in member for limiting transmission of the deformation-inducing contact forces applied thereon to a mirror mounted on an outer end of the member. The adjustment elements are movably adjustable for applying the deformation-inducing contact forces to the mirror-supporting member at circumferentially-spaced locations thereon between the first and second weakened region defining means thereof.

Accordingly, it is an object of the present invention to provide a laser mirror alignment mechanism which provides a more mechanically and thermally stable way of precisely aligning a mirror with a central axis of a laser; to provide a mirror alignment mechanism which tends to make mirror alignment impervious to detuning through vibration and shock; to provide a mirror alignment mechanism which is cost-effective; and to provide a mirror alignment mechanism which allows more precise control and refined adjustment of the mirror position.

DETAILED DESCRIPTION OF THE PREFERRED EMBODIMENT

Figure 1:
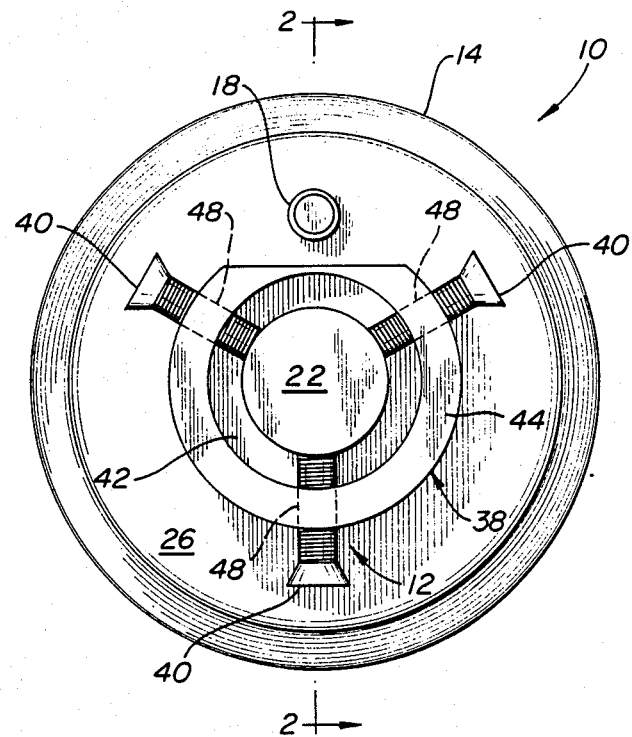
FIG. 1 is an end elevational view of a laser employing a mirror alignment mechanism constructed in accordance with the principles of the present invention.
Figure 2:
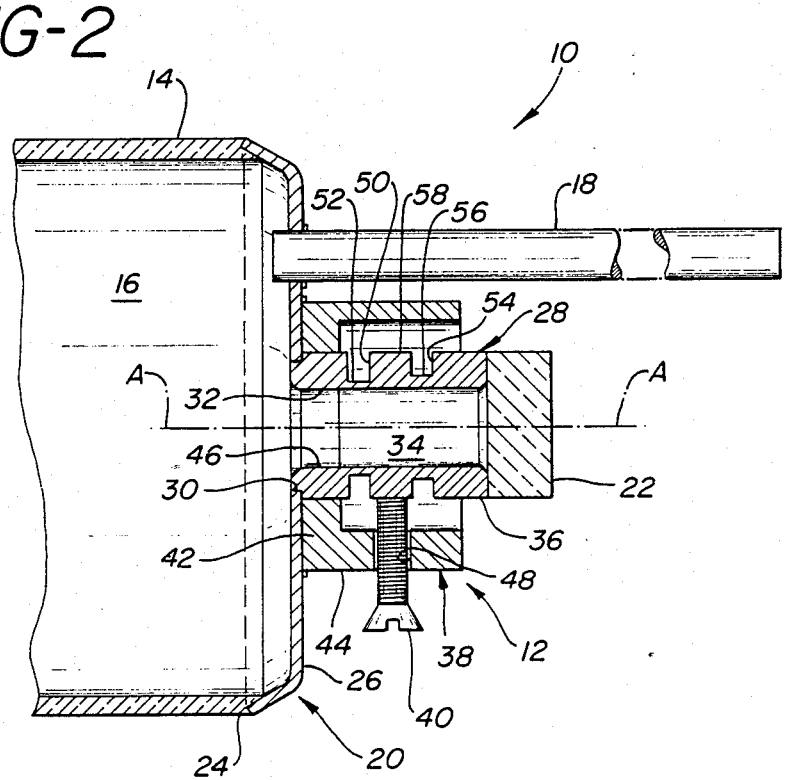
FIG. 2 is a longitudinal axial sectional view of the end portion of the laser employing the mirror alignment mechanism taken along line 2—2 of FIG. 1.

Reference is made to FIGS. 1 and 2 of the drawings which illustrate an end portion of a laser 10, such as a gas discharge type laser. The laser 10 employs a mirror alignment mechanism 12 which comprises a preferred embodiment of the present invention.

In its basic components, the laser 10 includes an outer envelope 14 providing a cavity 16 filled via a fill tube 18 with a gaseous mixture of helium and neon. An anode (not shown) and a cathode 20 are located at opposite ends of the envelope. Also, end mirrors 22 (only the one at the cathode end 24 of the envelope 14 being shown) are mounted adjacent respective ends of the outer envelope 14, and a bore tube (not shown) is mounted in coaxial relation with the envelope 14 within the cavity 16. To produce the desired lasing action, the bore tube and end mirrors 22 must be in precise alignment along a common central axis A of the laser 10.

The cathode 20 is composed of several electrically connected components including a generally cylindrical cathode tube (not shown) which is disposed in the outer envelope 14 at the one cathode end 24 thereof, a cathode end cap 26 which is attached to the one end 24 of the envelope 14, and a cathode post 28 electrically and mechanically connected thereto. The cathode end cap 26 has a central opening 30 and the cathode post 28 is fixed at its inner end 32 to the cathode end cap 26 about its opening 30 such that a central passage 34 through the cathode post 28 communicates with the opening 30 and is coaxially aligned with the central axis A of the laser 10. The cathode mirror 22 is mounted to an outer end 36 of the cathode post 28, such as by being adhesively bonded thereto, so as to extend generally perpendicular to the central axis A of the laser 10.

Adjustment of the cathode mirror 22 into a precisely aligned perpendicular relationship with the central axis A to provide optimum operation of the laser 10 is made possible in an improved manner by the mirror alignment mechanism 12 of the present invention. Although the alignment mechanism 12 is illustrated in conjunction with the cathode mirror 22, it may also be utilized with the anode mirror if desired. Therefore, it should be understood that the alignment mechanism 12 is not limited to use with the cathode mirror 22 at the cathode end 24 of the outer envelope 14.

The mirror alignment mechanism 12 includes an annular alignment member 38 mounted to the cathode end cap 26 in surrounding and outward radially spaced relation to the cathode post 28, and a plurality of adjustment elements 40 mounted to the annular member 38 at circumferentially spaced locations about the cathode post 28. The adjustment elements 40 are independently movably adjustable in a radial direction relative to the laser axis A toward and away from the cathode post 28 for selectively applying deformation-inducing contact forces on the cathode post directed transversely to the laser axis A for causing angular deformation of the cathode post 28 relative to the laser axis A to align the mirror 22 mounted on the outer end 36 of the cathode post 28 in the desired perpendicular relation to the axis A.

The annular alignment member 38 preferably is in the form of a cylindrical collar 38, for instance composed of stainless steel, which includes a base portion 42 attached to the cathode end cap, such as by epoxy or by being brazed thereto, and a cylindrical sidewall portion 44 connected to the periphery of the base portion 42 and extending axially therefrom. The base portion 42 of the collar 38 has a central aperture 46 sized to receive the cathode post 28 therethrough so that the collar 38 can be slipped over the cathode post 28 to install it on the cathode end cap 26.

The continuous sidewall portion 44 of the alignment collar 38 has a plurality of circumferentially-spaced holes 48 defined therethrough being aligned in a plane extending transverse to the axis A of the laser 10. The holes 48 preferably are internally threaded, adapting them to receive and mount the adjustment elements 40, preferably in the form of externally threaded screws, so that they extend radially with respect to the axis A. Three screws 40 are illustrated in FIG. 2; however, four or more could be utilized if desired.

For facilitating deformation of the cathode post 28 as is necessary to achieve the desired alignment of the cathode mirror 22 with the axis A, the cathode post 28 has means in the form of an outwardly-opening inner continuous groove 50 formed therein adjacent to the cathode end cap 26 and the base portion 42 of the alignment collar 38. The groove 50 defines a first continous annular weakened region 52 in cathode post 28 at the bottom of the groove 50. (A similar groove had been utilized heretofore in the prior art alignment arrangement discussed in the background section supra.) The groove 50 permits flexing and deformation of the cathode post adjacent to its attachment to the cathode end cap 26 and alignment collar 38 upon application of the deformation-inducing contact forces thereto by manipulation of selected ones of the adjustment screws 40.

The cathode post 28 also includes means in the form of an outwardly-opening outer continuous groove 54 formed therein spaced outwardly from the inner groove 50, remote from the cathode end cap 26 and the base portion 42, and adjacent to the outer end 36 of the post 28 and the mirror 22 mounted thereof. The groove 54 defines a second continuous annular weakened region 56 in cathode post 28 at the bottom of the groove 54. The purpose of the groove 54 and second weakened region 56 in the cathode post 28 is to limit transmission of the distortion to the mirror 22 on the outer end 36 of the cathode post 28 to avoid sufficient stressing of the bond to cause breaking off of the mirror 22. As seen in FIG. 2, the adjustment screws 40 are positioned to apply the deformation-inducing contact forces to the circumference of the cathode post 28 in the form of an annular land 58 defined between the inner and outer grooves 50, 54 and first and second weakened regions 52, 56.

The alignment mechanism 12 can actually be used in any one of several different approaches. In a first approach, all of the screws 40 are threadably adjusted to deform the cathode post 28 as required to align the mirror 22 in the proper relationship to the axis A. The screws 40 are then left in place. Another approach is to adjust the screws as in the first approach and then remove them from the collar 38. Since the post 28 has been deformed or bent to the desired extent, it will stay there and thus it is not necessary to leave the screws 40 mounted to the collar 38. A third approach is to install valier screws after the first set of screws 40 are removed. The valier screws have a plunger arrangement which allow for achievement of a more fine adjustment than can be accomplished with the ordinary screws 40.

Having thus described the laser mirror alignment mechanism of the present invention in detail and by reference to a preferred embodiment thereof, it will be apparent that modifications and variations are possible without departing from the scope of the invention defined in the appended claims.

What is claimed is:

1. A laser mirror alignment mechanism for a laser having a central axis and a hollow, mirror-supporting member mounted at an end of said laser and generally coaxially along the axis, said alignment mechanism comprising:

an annular member adapted to be mounted on said end of said laser in surrounding and outward radially spaced relation to the mirror-supporting member;

a plurality of adjustment elements mounted to said annular member at circumferentially spaced locations about the mirror-supporting member, said adjustment elements being independently movably adjustable in a radial direction relative to the laser axis toward and away from the mirror-supporting member for selectively applying deformation-inducing contact forces on the mirror-supporting member directed transversely to the laser axis for causing angular deformation of the mirror-supporting member relative to the laser axis to align the mirror mounted on the mirror-supporting member in a desired predetermined relation to the axis;

means defining a first weakened region in said mirror-supporting member for permitting deformation thereof upon selective application of said deformation-inducing contact forces thereto by said adjustment elements; and means defining a second weakened region in said mirror-supporting member spaced axially outward from said first weakened region for limiting transmission of said deformation-inducing contact forces being applied on said mirror-supporting member to a mirror mounted on said end of said mirror-supporting member opposite from the laser end.

2. The alignment mechanism of claim 1 in which said first weakened region defining means is in the form of a continuous groove defined about the mirror-supporting member.

3. The alignment mechanism of claim 1 in which said second weakened region defining means is in the form of a continuous groove defined about said mirror-supporting member.

4. The alignment mechanism of claim 1 in which said adjustment elements are movably adjustable for applying said deformation-inducing contact forces to said mirror-supporting member at circumferentially-spaced locations thereon between said first and second weakened region defining means thereof.

5. In a laser having an outer envelope for containing a lasing medium, a cathode and an anode, a pair of reflecting mirrors disposed at opposite ends of said envelope and defining a central axis of an optical cavity therebetween, a bore tube in axial alignment therewith, an end cap attached to an end of said envelope, a post comprising a hollow structure attached at an inner end to said end cap and extending axially therefrom generally coaxially along said central axis, one of said laser mirrors mounted to an outer end of said post, a mirror alignment mechanism comprising:

an annular member mounted to said end cap in surrounding and outward radially spaced relation to said mirror-mounting post;

a plurality of adjustment elements mounted to said annular member at circumferentially spaced locations about said post, said adjustment elements being independently movably adjustable in a radial direction relative to the laser axis toward and away from said post for selectively applying deformation-inducing contact forces on said post directed transversely to the laser axis for causing angular deformation of said post relative to the laser axis to align said mirror mounted on said post in a desired predetermined relation to the axis;

means defining a first weakened region in said post for permitting deformation thereof upon selective application of said deformation-inducing contact forces thereto by said adjustment elements; and means defining a second weakened region in the post spaced axially outward from said first weakened region for limiting transmission of the deformation-inducing contact forces being applied on said post to said mirror mounted on said outer end thereof.

6. The alignment mechanism of claim 5 in which said first weakened region defining means is in the form of a continuous groove defined about said post.

7. The alignment mechanism of claim 5 in which said second weakened region defining means is in the form of another continuous groove defined about said post adjacent to said outer end thereof.

8. The alignment mechanism of claim 5 in which said adjustment elements are movably adjustable for applying said deformation-inducing contact forces to said post at circumferentially-spaced locations thereon between said first and second weakened region defining means on said post.

9. The alignment mechanism of claim 1 in which said first and second weakened region defining means are in the form of continuous grooves extending circumferentially about said mirror-supporting member.

10. The alignment mechanism of claim 5 in which said first and second weakened region defining means are in the form of continuous grooves extending circumferentially about said post.

* * * * *